(12) United States Patent
Szymanski et al.

(10) Patent No.: US 10,157,294 B2
(45) Date of Patent: Dec. 18, 2018

(54) SYSTEMS, METHODS AND COMPUTER PROGRAM PRODUCTS FOR MANAGING REMOTE EXECUTION OF TRANSACTION DOCUMENTS

(71) Applicant: CaffeiNATION Signings (Series 3 of Caffeination Series, LLC), Waunakee, WI (US)

(72) Inventors: Curt Daniel Szymanski, Waunakee, WI (US); Myles Kenneth Leighton, Durham, NC (US)

(73) Assignee: CaffeiNATION Signings (Series 3 of Caffeinaton Series, LLC), Waunakee, WI (US)

( * ) Notice: Subject to any disclaimer, the term of this patent is extended or adjusted under 35 U.S.C. 154(b) by 1114 days.

(21) Appl. No.: 14/285,873

(22) Filed: May 23, 2014

(65) Prior Publication Data
US 2015/0149324 A1 May 28, 2015

Related U.S. Application Data

(60) Provisional application No. 61/908,967, filed on Nov. 26, 2013.

(51) Int. Cl.
| | |
|---|---|
| G06Q 30/00 | (2012.01) |
| G06F 21/64 | (2013.01) |
| G06Q 30/06 | (2012.01) |
| G06F 17/22 | (2006.01) |
| G06F 21/31 | (2013.01) |
| G06F 21/32 | (2013.01) |
| H04L 29/06 | (2006.01) |
| G06F 17/30 | (2006.01) |

(52) U.S. Cl.
CPC .......... *G06F 21/64* (2013.01); *G06F 17/2288* (2013.01); *G06F 17/30011* (2013.01); *G06F 21/31* (2013.01); *G06F 21/32* (2013.01); *G06Q 30/0635* (2013.01); *H04L 63/123* (2013.01); *G06F 2221/2111* (2013.01); *G06F 2221/2151* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | |
|---|---|---|---|
| 6,944,651 | B2 | 9/2005 | Onyon et al. |
| 7,315,837 | B2 | 1/2008 | Sloan et al. |
| 7,539,628 | B2 | 5/2009 | Bennett et al. |
| 7,548,884 | B1 | 6/2009 | Thomas |
| 7,630,933 | B2 | 12/2009 | Peterson et al. |
| 7,934,098 | B1 | 4/2011 | Hahn et al. |
| 8,086,951 | B2 | 12/2011 | Kopp et al. |

(Continued)

*Primary Examiner* — Ethan D Civan
(74) *Attorney, Agent, or Firm* — Sage Patent Group

(57) ABSTRACT

Provided are methods, systems and computer program products for providing remote document execution. Such methods, systems and computer program products may include storing an electronic document as a secure electronic file, identifying a signature space in the electronic document, the signature space, after being executed, includes a signature of a signing party of the electronic document, receiving the signature of the signing party into the electronic document stored as the secure electronic file and responsive to receiving the signature of the signing party, converting the electronic document into a read only electronic document.

20 Claims, 13 Drawing Sheets

(56) References Cited

U.S. PATENT DOCUMENTS

| | | | |
|---|---|---|---|
| 8,155,632 | B2 | 4/2012 | Lewis et al. |
| 8,255,978 | B2 | 8/2012 | Dick |
| 8,413,058 | B1 | 4/2013 | Lewis et al. |
| 8,521,742 | B2 | 8/2013 | McGowan et al. |
| 8,554,756 | B2 | 10/2013 | Gemmell et al. |
| 8,694,401 | B2 | 4/2014 | Stewart |
| 8,930,263 | B1 | 1/2015 | Mahacek et al. |
| 8,976,224 | B2 | 3/2015 | Smith et al. |
| 9,330,544 | B2 | 5/2016 | Levesque et al. |
| 9,400,974 | B2 | 7/2016 | O& et al. |
| 2002/0059137 | A1 | 5/2002 | Freeman et al. |
| 2002/0143711 | A1* | 10/2002 | Nassiri ............... G06Q 20/3821 705/76 |
| 2003/0009418 | A1 | 1/2003 | Green et al. |
| 2003/0172025 | A1 | 9/2003 | Gallina |
| 2004/0006595 | A1 | 1/2004 | Yeh et al. |
| 2004/0098281 | A1 | 5/2004 | Chien et al. |
| 2004/0128350 | A1 | 7/2004 | Topfl et al. |
| 2005/0102520 | A1* | 5/2005 | Baxter .................... G06F 21/64 713/176 |
| 2005/0209955 | A1 | 9/2005 | Underwood et al. |
| 2008/0133402 | A1 | 6/2008 | Kurian et al. |
| 2008/0275794 | A1 | 11/2008 | Ioimo et al. |
| 2010/0010993 | A1 | 1/2010 | Hussey, Jr. et al. |
| 2010/0153858 | A1 | 6/2010 | Gausman et al. |
| 2011/0125632 | A1 | 5/2011 | Neel |
| 2012/0204119 | A1 | 8/2012 | Lefar et al. |
| 2013/0039633 | A1* | 2/2013 | Wong .................. H04N 9/8205 386/224 |
| 2013/0046833 | A1 | 2/2013 | Riepling et al. |
| 2013/0091050 | A1 | 4/2013 | Merrill et al. |
| 2013/0138553 | A1 | 5/2013 | Nikankin et al. |
| 2014/0325396 | A1 | 10/2014 | Sterman et al. |

* cited by examiner

SYSTEMS, METHODS AND COMPUTER PROGRAM PRODUCTS FOR MANAGING REMOTE EXECUTION OF TRANSACTION DOCUMENTS

RELATED APPLICATIONS

This non-provisional patent application claims priority to U.S. Provisional Application Ser. No. 61/908,967, filed Nov. 26, 2013, the disclosure of which is hereby incorporated herein by reference as if set forth fully herein.

BACKGROUND

The emergence of electronic signing has generally demonstrated its convenience. However, current electronic signing solutions may not be secure because they may rely on a transfer of the documents as a whole. Some solutions include getting a signature or signature mark on a portable document format (PDF) document and transferring a signed document to other parties. However, documents which require a signature may have substantially important delivery requirements, which may not be met according to current electronic signing solutions.

BRIEF SUMMARY

Some embodiments of the present invention are directed to a computer system that includes a processor and a memory coupled to the processor. The memory may include computer readable program code embodied therein that, when executed by the processor, causes the processor to store an electronic document as a secure electronic file and identify a signature space in the electronic document. The signature space, after being executed, includes a signature of a signing party of the electronic document. The signature of the signing party may be received into the electronic document stored as the secure electronic file, and responsive to receiving the signature of the signing party, the electronic document may be converted into a read only electronic document.

Some embodiments provide that the secure electronic file is stored as a single instance and is configured to be modified responsive to receipt of data corresponding to the signature of the signing party.

In some embodiments, receiving the signature of the signing party is performed during a signing session. Embodiments may include providing access to the electronic document to the signing party and/or a non-signing party as a preview before the signing session.

In some embodiments, the signature includes multiple instances of the signature, the signature space includes multiple signature spaces that are configured to receive corresponding ones of the instances of the signature. Some embodiments provide that each of the instances of the signature corresponds to a different signing activity performed by the signing party.

Some embodiments include sending an invitation to the signing party to participate in a signing session via a secure link. Some embodiments include capturing a visual image of the signing party via an image capture device on a device that is proximate the signing party and validating an identity of the signing party by comparing the visual image of the signing party to an image from a signing party document. In some embodiments, the user document includes at least one of a file photograph and an image of an identification document.

Some embodiments include capturing a visual image of the signing party via an image capture device on a device that is proximate the signing party and validating an identity of the signing party by receiving an identification confirmation from another party that verifies that the visual image corresponds to the signing party.

Some embodiments include validating an identity of a signing party using social media data corresponding to at least one of multiple social media services. In some embodiments, the social media data includes social media login data. Some embodiments provide that the social media data includes a photograph and/or personal data.

Some embodiments include capturing a video of the signing session via an image capture device on a signing session device.

Some embodiments include providing a third party with an image or video of a signing session via an image capture device camera on a signing session device. Some embodiments include providing the third party with an input field that is configured to receive an endorsement of the signature.

Some embodiments include providing multiple parties with image data corresponding to the electronic document to witness the signing session from a location other than a location of the signing party. In some embodiments, a signing transfer input is received from the signing party and a subsequent signing operation is transferred to another signing party responsive to receiving the signing transfer input.

In some embodiments, the signature space comprises multiple signature spaces and the signature spaces include first signature spaces that are configured to receive a first signature corresponding to a first signing party and second signature spaces that are configured to receive a second signature from a second signing party. Some embodiments provide that the signing session is active for the first signing party and the second signing party at the same time and that the first signature and the second signature may be received in the signing session.

Some embodiments include capturing a visual image of the signing party via an image capture device on a device that is proximate the signing party by automatically tuning the image capture device to capture the actual signing in a signing video and communicating the signing video to other viewers. Some embodiments include receiving uploaded scanned images and/or video of signed documents via the device. In some embodiments, the device includes a mobile terminal. In some embodiments, the signing video captures a signature speed, a signature cadence, and/or forensic signature data corresponding to each occurrence of a signature.

Some embodiments of the present invention are directed to methods that include operations such as storing an electronic document as a secure electronic file, identifying a signature space in the electronic document, the signature space, after being executed, includes a signature of a signing party of the electronic document, receiving the signature of the signing party into the electronic document stored as the secure electronic file, and responsive to receiving the signature of the signing party, converting the electronic document into a read only electronic document. In some embodiments, the signing party is in the presence of a signature certifying agent. Some embodiments provide that the signing party is remotely located from a signature certifying agent and that a visual image of the signing party may be captured via an image capture device on a device that is proximate the signing party by automatically tuning the image capture device to capture the actual signing in a signing video. The signing video may be communicated to the signature certifying agent and a signature certification may be received from the signature certifying agent. In some embodiments, receiving the signature certification includes receiving an image of a certified document that is executed by the signature certifying agent. Some embodiments provide that the signature certifying agent includes an e-notary that affixes an electronic signature and an electronic notary seal to the document.

Embodiments of the present invention are directed to computer program products that include a computer readable storage medium having computer readable code embodied in the medium. The computer code includes computer readable code that is operable to perform operations corresponding to methods and systems disclosed herein.

Some embodiments of the present invention are directed to a mobile terminal that includes a processor, a user input device that is configured to receive inputs from a user, and a memory coupled to the processor. The memory may include computer readable program code embodied therein that, when executed by the processor, causes the processor to generate a graphical user interface that is operable to perform operations corresponding to methods and systems disclosed herein. For example, the processor may generate a graphical user interface that includes a view of an electronic document that is stored as a secure electronic file on a computing device that is remote from the mobile terminal and generate a representation of a closing room that includes representations of multiple parties at a closing event in which the electronic document is executed via a signature space in the electronic document including a signature of a signing party of the electronic document stored as the secure electronic file. In some embodiments, the graphical user interface is further configured to cause the electronic document to be converted into a read only electronic document responsive to receiving the signature of the signing party.

Some embodiments include computer readable program code therein that causes the processor to be communicatively coupled to a remote document execution service that may be configured to store an electronic document as a secure electronic file, identify a signature space in the electronic document, the signature space, after being executed, including a signature of a signing party of the electronic document, receive the signature of the signing party into the electronic document stored as the secure electronic file, and responsive to receiving the signature of the signing party, convert the electronic document into a read only electronic document.

Some embodiments of the present invention are directed to a computer system that includes a processor and a memory coupled to the processor. The memory may include computer readable program code embodied therein that, when executed by the processor, causes the processor to perform operations including storing an electronic document as a secure electronic file, identifying a signature space in the electronic document, the signature space, after being executed, includes a signature of a signing party of the electronic document, receiving the signature of the signing party into the electronic document stored as the secure electronic file, responsive to receiving the signature of the signing party, converting the electronic document into a read only electronic document and identifying a physical signing facility that provides services and/or products that are unrelated to a subject matter of the electronic document.

In some embodiments, identifying the physical facility includes providing a list of a plurality of physical signing facilities to the signing party and receiving a selection corresponding to the physical signing facility from the signing party. Some embodiments include receiving, from the signing party, an order for a selected service and/or product from the provided services and/or products and sending the order to the physical signing facility. In some embodiments, sending the order to the physical signing facility includes sending an identification for the selected service and/or product and a graphical representation of the signing party.

Some embodiments include providing payment to the physical signing facility for the selected service and/or product. Some embodiments include providing, for the physical signing facility, marketing materials that are configured to accompany the selected service and/or product and/or that are configured to be displayed on a premises of the physical signing facility. Some embodiments provide that a menu of provided services and/or products is sent to the signing party before the order for the selected service and/or product is received from the signing party. In some embodiments, the menu includes a generic menu that corresponds to a type of service and/or product provided by the physical signing facility.

Some embodiments include sending a confirmation message a given time before a scheduled time for a planned signing session that includes identification of the selected service and/or product and directions to the physical signing facility. Some embodiments include generating a searchable data file of physical signing facilities and corresponding locations, respectively.

In some embodiments, the signing party is in the presence of a signature certifying agent. Some embodiments provide that the signing party is remotely located from a signature certifying agent. In such embodiments, a visual image of the signing party may be captured via an image capture device on a device that is proximate the signing party by automatically tuning the image capture device to capture the actual signing in a signing video, the signing video may be communicated to the signature certifying agent, and a signature certification may be received from the signature certifying agent. Some embodiments provide that receiving the signature certification includes receiving an image of a certified document that is executed by the signature certifying agent.

Some embodiments of the present invention are directed to computer program products that include a computer readable storage medium having computer readable code embodied in the medium. The computer code is operable to perform functions corresponding to systems and methods as described herein. In some embodiments, the computer readable code may be operable to store an electronic document as a secure electronic file, identify a signature space in the electronic document. The signature space, after being executed, may include a signature of a signing party of the electronic document. The signature of the signing party may be received into the electronic document stored as the secure electronic file and responsive to receiving the signature of the signing party, the electronic document may be converted into a read only electronic document. A physical signing facility that provides services and/or products that are unrelated to a subject matter of the electronic document may be identified. An order for a selected service and/or product from the provided services and/or products may be received from the signing party and the order may be sent to the physical signing facility.

In some embodiments, identifying the physical facility includes providing a list of a plurality of physical signing facilities to the signing party and receiving a selection corresponding to the physical signing facility from the signing party. Some embodiments provide that sending the order to the physical signing facility includes sending an identification for the selected service and/or product and a graphical representation of the signing party. Some embodiments include computer readable code to provide payment for the selected service and/or product.

In some embodiments, before receiving the order for the selected service and/or product from the signing party, operations may include sending a menu of the provided services and/or products to the signing party. Some embodiments provide that the menu includes a generic menu that corresponds to a type of service and/or product provided by the physical signing facility. In some embodiments, a confirmation message is sent a given time before a scheduled time for a planned signing session that includes identification of the selected service and/or product and directions to the physical signing facility.

Some embodiments include generating a searchable data file of physical signing facilities and corresponding locations, respectively.

In some embodiments, receiving the signature of the signing party into the electronic document includes capacitively receiving the signature on a touch screen interface that captures signing pressure, signing speed, and/or stylistic properties of the signature.

Some embodiments include generating a review record that includes evidence of the signing party level of review of the electronic document during the signing session.

Some embodiments include generating electronic document review control inputs that include a scroll speed input, a pause input, a stop input, and/or a resume input.

Some embodiments provide include receiving an alignment input from a user to align the signature to the signature space in the electronic document. In some embodiments, receiving the signature of the signing party is from a location that is independent of a location of the stored electronic file and that is independent of other signing parties and/or non-signing parties in a signing session. Some embodiments include, before receiving the signature of the signing party, transmitting an electronic representation of the electronic document to a representative of the signing party to counsel the signing party regarding contents of the electronic document.

In some embodiments, identifying the signature space includes identifying a plurality of signature spaces, the signature of the signing party includes a first signature of a first signing party and a second signature of a second signing party, and receiving the signature of the signing party includes receiving the first signature of the first signing party into a first one of the plurality of signature spaces, receiving a hand-off input from the first signing party after the first signature is provided, responsive to receiving the hand-off input, providing a second signature space of the plurality of signature spaces to the second party, and receiving the second signature from the second signing party into a second one of the plurality of signing spaces.

In some embodiments, receiving the first signature and/or receiving the second signature is viewed by the second signing party and/or the first signing party, respectively. Some embodiments include generating a representation of a virtual signing room that includes a graphical representation of an occupancy space in which a signing session is visually represented, the graphical representation including graphical representations corresponding to ones of a plurality of participants in the signing session. Some embodiments provide that the virtual signing room is generated on a remote electronic device via wired and/or wireless communication.

In some embodiments, generating a communication channel between at least two of the plurality of participants in the signing session. Some embodiments provide that the communication channel between the at least two of the plurality of participants in the signing session is private relative to other ones of the plurality of participants in the signing session. Some embodiments include receiving, from ones of the plurality of participants, background selection data corresponding to a selection of a background setting of the virtual signing room.

In some embodiments, the background selection data is different for different ones of the plurality of participants. Some embodiments include receiving, from one of the plurality of participants an invitation to another one of the plurality of participants to share common background selection data. In some embodiments, the background selection data corresponds to a boardroom appearance and/or an exotic location appearance. Some embodiments provide that the representation of the virtual signing room includes a plurality of view modes that include a two-dimensional view mode, a three-dimensional view mode and/or a focus view mode that includes a representation of the electronic document and/or one of the plurality of participants in the signing session.

In some embodiments, generating the representation of a virtual signing room comprises generating the graphical representation having a signing table size and/or virtual signing room that is a function of a quantity of the plurality of participants in the signing session. Some embodiments provide that generating the representation of a virtual signing room includes generating the graphical representation having a signing table size and/or virtual signing room that is a function of a quantity of the plurality of participants in the signing session.

In some embodiments, generating the representation of a virtual signing room includes generating a plurality of virtual signing rooms that correspond to the signing session, wherein ones of the plurality of virtual signing rooms correspond to different ones of the plurality of participants. Some embodiments provide that the signing table size in each of the plurality of virtual signing rooms is a function of a quantity of ones of the plurality of participants in respective ones of the plurality of virtual signing rooms.

In some embodiments, generating the representation of the virtual signing room is performed using a electronic gaming system, a mobile terminal and/or via an Internet connected computing device.

Some embodiments provide that ones of a plurality of participants in the signing session are notified responsive to other ones of the plurality of participants entering and/or leaving the virtual signing room. Some embodiments provide that before receiving the signature of the signing party, the graphical user interface is configured to receive practice signatures from the signing party that are not received into the electronic document.

In some embodiments, the graphical user interface is further configured to receive a Phone An Advisor input that, responsive to receipt thereof, causes an advisor of the signing party to be contacted.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present inventive concept, and be protected by the accompanying claims.

BRIEF DESCRIPTION OF THE DRAWINGS

Aspects of the present disclosure are illustrated by way of example and are not limited by the accompanying figures with like references indicating like elements.

FIGS. 12A and 12B are images depicting screen shots of a virtual signing room graphical user interface according to some embodiments of the present inventive subject matter.

DETAILED DESCRIPTION

Figure 1:
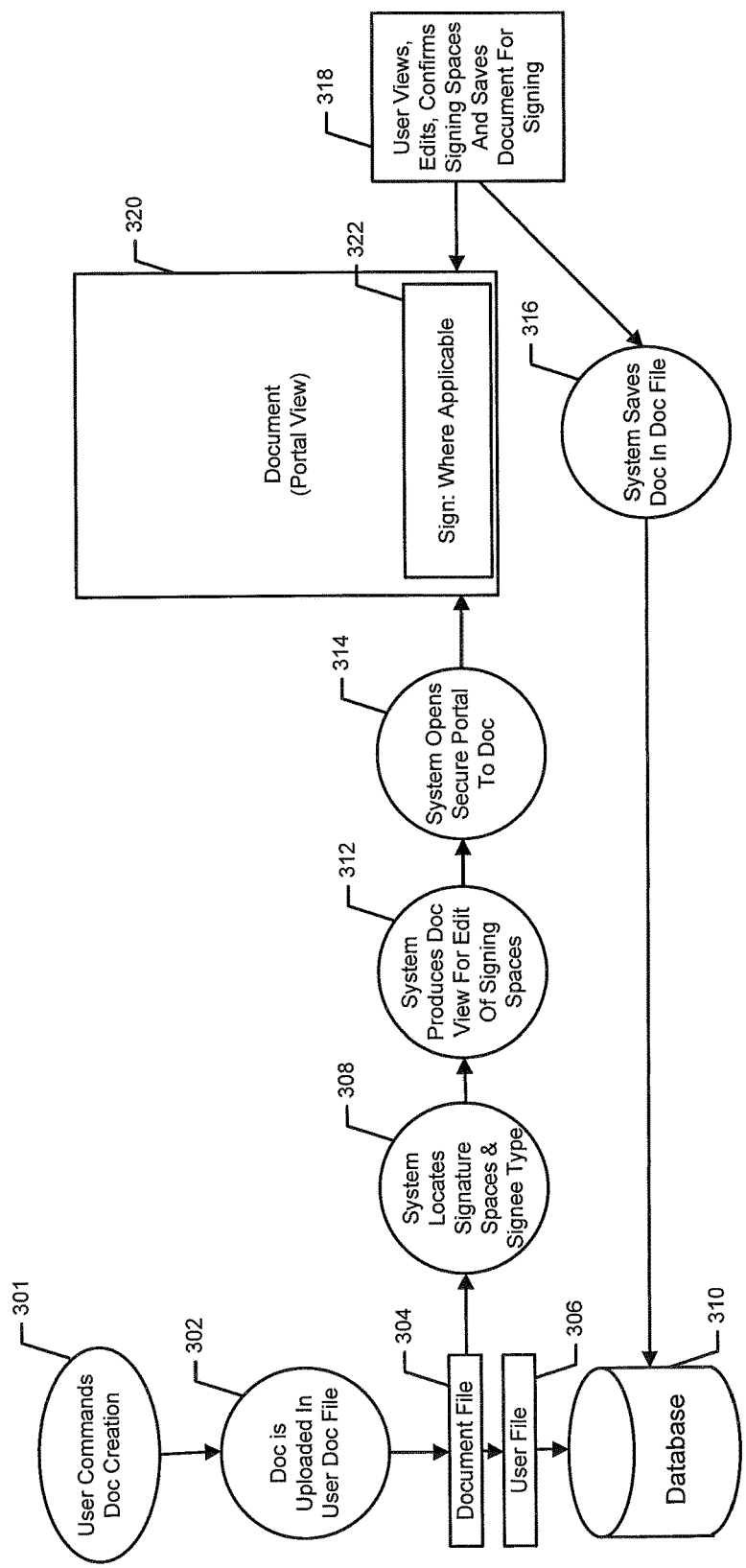
FIG. 1 is a block diagram illustrating operations and structures for creating a secure signature ready document for remote execution according to some embodiments of the present inventive subject matter.

Some embodiments provide that an electronic signing solution may provide a document in which a remote view of the document is provided while the document remains in a secure location. In this regard, the electronic signature may be transferred without affecting control of the document. As disclosed herein, the secure transfer of a signature may be provided while keeping the document safely unmoved from a secure electronic vault.

In some embodiments, the documents may be kept secure on a vaulted server. The signature spaces in the document may be kept live and accessible to be visible to multiple users to enable real-time signing. In this manner, the need to send the documents may be negated. Security breaches may be avoided by using actual and/or real-to-life signing technology instead of signature stamps or other signature surrogates. Embodiments described herein may be used for any electronic transaction involving a single endorsement of a document or a coordination of a multi-party formal closing using a document set. In some embodiments, a user verification process may be provided. Some embodiments provide for channels for observation by third parties, such a notaries.

In some embodiments of a secure electronic signature system, an original electronic document may be prepared from a template and/or as a unique document. The original electronic document may be placed into a secure electronic file on a host server. In some embodiments, signature spaces in the original electronic document may be identified by addressee recognition using, for example, optical character recognition (OCR), ASCII text parsing and matching against search parameters and/or other similar techniques. In some embodiments, unique documents may be optically scanned using a stationary and/or mobile computer and/or photographed using a mobile device. The image data corresponding to the scanned/photographed document may be sent to the host server.

Once on the host server, the signature spaces and addressees may be identified and/or opened up for electronic signing. Some embodiments provide that the user can view the entire document. For example, the user may touch and/or click on a signature space, which may open up for signing if they are the registered addressee for that signature space. In this manner, incorrect signing may be prevented. The quantity of signatures needed and/or provided may be determined. For example, systems and methods disclosed herein may compare the quantity of signatures needed with the quantity of signatures provided for each signing party to verify that the document is fully executed. The quantity of signatures needed and/or provided may be sent to the user and/or other party. As disclosed herein, each signature space is configured to receive a separate signature from a signing party.

In some embodiments, the user may use their mouse, finger, and/or a user interface stylus to make an actual real signature in the space. Some embodiments provide that the user interface stylus may include a capacitive and/or inductive pen. The signature may be transferred to the vaulted original document. Once all of the signatures have been received, the document may be sealed on the host server and may be available in view-only mode.

Some embodiments provide that a computer and/or mobile device camera may allow third parties, such as notaries and/or attorneys, to be present and to endorse in the same way.

Some embodiments include a computerized system for enabling electronic signing of documents by aligning and transferring signatures to matching fields of a document, using a mouse, stylus, and/or fingertip. Users can access the system remotely and/or physically together, because the system may serve as a signing platform that is location independent.

Some embodiments provide that signatures are not copied and that each signature may be made and thus may be unique in order to exact the features of a non-electronic signing, and thus a perfect parallel.

In some embodiments, a user may be sent an invitation to use the systems, methods and computer program products by secure link. Some embodiments provide that an attorney may pre-inspect documents and have a counseling session with client prior to signing, via some embodiments disclosed herein. As disclosed herein, secure methods for electronically signing documents may be provided that do not include the transfer of the document. In this regard, no copies of the document may be created.

Some embodiments include a capacitive method for signing on a touch screen device that captures the pressure, speed, and stylistic aspects of the signature for forensic validation.

In some embodiments, a camera recording function may capture a video of the signing activity. A signor hand-off function in which a signor may pass the electronic signing opportunity to the next signor may be provided. Some embodiments provide that the signor may view the signing activity by other signors and/or exit when done.

Some embodiments include secure methods for storing, viewing, and signing documents through a web service and mobile device. Methods may include validating users and/or signors using file photographs, driver's licenses and/or the computer and/or mobile device's camera to allow an officiator to verify identity in real or substantially real time. In some embodiments, social login data may be used to validate users on the system. Social application pictures of self and personal data may be matched using image and/or facial recognition technology to verify a user.

In some embodiments, third party officiators may view a signing session and may make their own endorsements. Visual access to the electronic documents may be provided via the camera devices of a computer and/or mobile device.

Some embodiments provide that any document may be created and/or converted into a signature-ready document, while storing the documents securely.

Some embodiments provide that a virtual signing room that is a realistic representation of a closing and/or signing room may be generated to enhance the experience of the signing. The virtual signing room may be generated on a remote electronic device such as a mobile and/or fixed terminal that is connected via a wired and/or wireless connection. Each user may view others in the virtual signing room as avatars that may include the face of the user projected onto the avatar from the user's camera. Some embodiments provide that two users may chat and/or video chat privately with face-to-face video view, and/or multiple users with multiple views in a panel.

In some embodiments, each user may select a virtual signing room background setting and/or theme. The background setting may define the look and feel of the virtual signing room and may be selected from a substantially generic boardroom appearance to an exotic location and/or setting such as a tropical island setting. Some embodiments provide that the background setting may include additional visual clues that are consistent with the background setting such as a signing table being displayed as a surfboard. In some embodiments, each user may select a background setting that is different from other users. Some embodiments provide that a user may invite one or more other users to share the background setting selected thereby.

In some embodiments, an organizational platform to check-off the list of events pertaining to the closing may be provided. Some embodiments include a coordination platform that may create transparency of the other parties in the signing event to endorse and officiate documents.

In some embodiments, a multiple closing room view may be generated in two and/or three dimensional modes. Focus modes may enable a user to see the document, the room, and/or the other signor(s). Parallel signing capability may enable multiple signors to endorse document(s) simultaneously or substantially simultaneously.

In some embodiments, signing capability may be provided for a single person on a document or multiple signors and officiators located in multiple different locations.

In some embodiments, a provisional space for one or more witnesses, such as attorneys, may be provided for such parties to join the closing with and/or on the behalf of the signor.

In some embodiments, each user may be identified as a party to the signing transaction with codes, symbols, and/or avatars.

Some embodiments provide that users may access systems and operations disclosed herein via any Internet connected device (web, mobile, and gaming devices).

Some embodiments include partner viewing rights of a document. Partner viewing rights may specify viewing rights for the document, including control modes, such as who can view what, who can sign what, and who can edit for the purpose of coordinating the signing execution. Some embodiments provide a verification function for checking the completeness and quality of the signed document. In some embodiments, the verification function may be animated by graphically illustrating the check-offs and the documents getting locked into a vault. Some embodiments provide that the user may practice signing and viewing a document in a signing tutorial.

Some embodiments provide that the electronic and/or scanned actual signatures of multiple signing parties are recorded and received. After the signatures are received signing parties and/or other authorized parties may selectively access any and/or all of the recorded signing events.

In some embodiments, any one of multiple signing parties may request to receive a message, such as, email, telephone, text message and/or instant message, that indicates that a signing party is engaged in a signing session. Some embodiments provide the message includes a link and/or access address that, when executed, allows such parties to view the signing session in substantially real time. Signing parties may request a link to view the signing recordation as stored in the data repository for at least a given period of time after the signing session.

Some embodiments provide that the signing data and/or video can be communicated to other parties as evidence of the document execution. In some embodiments, the signing data and/or video may be communicated to other parties as evidence of each signature. For example, speed, cadence, forensic signature data and/or video associated with each and every signature space may be provided as XML, attribute, and/or embedded data in a document, such as, for example, a smart PDF. In some embodiments, signing data, video and/or attributes may be stored in a database and/or other storage repository.

In some embodiments, systems and methods herein may provide different operating modes, which a user may select. Examples of such modes include practice signing, document review, 2D and 3D aerial room view, chat and/or video chat function for private and/or public communication, verification, actual signing, and post signing review for quality and completeness checking, with screen dominance functions to use the whole screen for the activity in the sequence.

In some embodiments, systems and methods herein may include a temporal sequence (of the whole process and each user's task) with metrics that may measure completeness.

In some embodiments, systems and methods described herein may provide a user with a user input such as "PHONE AN ADVISOR" in which an advisor may be contacted to watch and/or advise as the user is signing documents. Some embodiments may further include a user input to turn on a camera, such as a web cam or other image capture device. Such functionality may be provided in a preview process in which a signor may be guided through the process in advance of the signing session or in a guided advisory process in which the signor is guided through the signing session. In some embodiments, the remote advisor may be provided with a user interface that provides the advisor with control over which documents and portions thereof are displayed and/or available for receiving a signature. Such functionality may provide the advisor with control over the process to ensure that each signature space is executed individually.

Additionally, the process of reading/reviewing the documents may be tracked and/or logged to provide a record that evidences that the signor was presented with every portion of the document and that the signor individually signed each signature space. In some embodiments, scrolling through the documents may be tracked and the scrolling speed may be controlled to a given scrolling speed to provide a reading pace for material that is between signature spaces. Some embodiments provide scroll speed controls including STOP, PAUSE and/or RESUME, among others.

In some embodiments, an electronic signing operation may occur at a location that is generally configured to provide service and/or products other than the electronic execution of documents. For example, a coffee house or shop that includes network access capability may serve as a physical signing facility. In this regard, a physical signing facility that provides services and/or products that are unrelated to a subject matter of the electronic document may be identified. Some embodiments provide that a list of a potential physical signing facilities may be sent or otherwise provided to the user, who may select a physical signing facility from facilities on the list. A selection corresponding to the physical signing facility may be received from the signing party.

Some embodiments further include receiving, from the user, an order for a selected service and/or product corresponding to the physical signing facility. For example, an order may include identification of a coffee beverage and/or food order corresponding to a specific and/or generic coffee and/or food item that is typically provided by the selected physical signing facility and/or a type thereof. For example, in the context of a coffee house, most conventionally available coffee beverages and types thereof, including permutations such as preparation techniques and/or contents therein, may be received.

The order may be transmitted and/or otherwise communicated to the physical signing facility. In some embodiments, the order may be transmitted to a centrally located order processing system, while other embodiment provide that the order is transmitted to the physical signing facility itself. Some embodiments provide that the order may include a picture, other graphical representation and/or description of the user in addition to the service and/or product identified in the order. In this regard, a request for picture or other image of the signing party may be requested when the request for selection from the list of a potential physical signing facilities is sent. As such, a picture and/or other image of the signing party may be received with the selection corresponding to the physical signing facility so that products can be delivered upon arrival to corresponding person(s), and/or so that the picture can be used for notary, advisor and/or other person meeting a signer at a signing location. In this manner, the third party (notary, advisor and/or other person) may identify the correct person as the signing party.

Some embodiments provide that a payment for the selected service and/or product is sent to the physical signing facility and/or agent or representative thereof. In some embodiments, the payment may be provided as an aggregated payment for multiple different purchases, while some embodiments provide that the payment is provided for a single transaction. In some embodiments, a electronic payment coupon may be transmitted to the signing party prior to the signing event and the signing party may provide data corresponding to the electronic payment coupon to the physical signing facility that results in payment for the selected service and/or product. For example, in the context of a smart phone used by the signing party, a visual coupon image such as a bar code may be scanned by the physical signing location to receive payment for the service and/or product.

Some embodiments provide that, when delivered to the signing party, the service and/or product may be accompanied by marketing materials corresponding to the electronic signing service provider. For example, the physical signing facility may be provided with marketing materials such as, but not limited to cups, wrappers, cup sleeves, stickers, labels, containers and/or banners, among others, that may be delivered to the signing party with the selected service and/or product. In some embodiments, the marketing materials may include signage that identifies the physical signing facility as a designated participant in electronic signing.

In some embodiments, responsive to receiving a selection of the physical signing facility from the signing party and/or identifying the physical signing facility, a menu of the provided services and/or products may be sent to the signing party. Some embodiments provide that the menu is a generic menu that corresponds to a type of service and/or product provided by the physical signing facility, while other embodiments provide that the menu is specific to the services and/or products offered by the selected physical signing facility. In some embodiments, the order may be transmitted to the physical signing party via their mobile terminal upon arrival.

Some embodiments provide that a searchable data file of physical signing facilities and corresponding locations may be generated. In some embodiments, the data file may include data regarding the specific and/or generic offerings of services and/or products corresponding to respective ones of the different physical signing facilities. Additional each entry in the data file may include the connectivity capabilities and/or limitations corresponding to the physical signing facilities as well as data corresponding to events or conditions that may present challenges regarding a signing session. For example, the presence of live entertainment at a given time/day may be informative as to the suitability of a particular physical signing facility at that time/day. Some embodiments provide that the searchable data file includes a database that may rank and/or order physical signing facilities based on one or more factors including, but not limited to location parameters, proximity parameters, revenue generation data, rating data, etc.

Some embodiments provide that rating data may include data regarding a signing party's experience with the physical signing facility including different parameters and sub-questions such as service and/or product quality, atmosphere, and/or strength and reliability of connectivity, among others. Additionally, a signing party may be prompted to provide rating and/or experience data to one or more social networks such as Facebook and/or Twitter, among others. Such ratings and/or experience data may be captured in the rating data and/or may be viewed by subsequent visitors.

In some embodiments, a confirmation message may be sent to the signing party a given time before a scheduled time for a planned signing session. For example, the confirmation message may be sent about one hour prior to the scheduled time for the planned signing session. The confirmation message may include a confirmation regarding the order of the selected services and/or products and directions to the physical signing facility that may include the current location of the signing party.

Reference is now made to FIG. 1, which is a block diagram illustrating operations and structures for creating a secure signature ready document for remote execution according to some embodiments of the present inventive subject matter. A user may execute a command to create a secure electronic document for remote electronic signing (block 301). As used herein, the terms "document" and "electronic document" may refer to a secure electronic document according to the present disclosure. The document may be uploaded in a document file 304 that may be associated with a user file 306, each of which may be stored in a database 310 (block 302). According to systems and methods herein, signature spaces in the document may be located and the signee type may be determined (block 308). In some embodiments, the document may be a standardized form, such as an application. In such embodiments, the signature spaces may be pre-identified and ready for signing.

Some embodiments of systems and methods herein may produce a document view for receiving manual edits corresponding to signature spaces (block 312). A secure portal may be opened to provide access to the document (block 314). The document accessed through the portal view 320 may include the signature spaces 322 identified therein. The user may view, edit, confirm the signature spaces and save the document for signing (block 318). The document may be saved in the database 310 (block 316).

While electronic signing may be provided herein, in some embodiments, operations described herein may include receiving electronic scans, photocopies of and/or originally executed documents that are physically signed on paper from one or more signing parties. For example, a signing party may be unreceptive to electronically signing. Some embodiments provide that a location of a physical signing may be captured. In this regard, one or more signing parties may electronically sign as described herein while another one or more signing parties may physically sign. In some embodiments, a video of the physical signing may be generated and received.

In some embodiments, a location for signing may be selected by a signing party. The location may be a signing party's home or an agent/partner location, such as, for example, an office of a title company, escrow company, real estate agent, lender, insurance agent, auto dealership, and/or airport, among others. Some embodiments provide that images of executed documents having physical notary stamps may be uploaded to the data repository. In some embodiments, the documents can be electronically executed as described herein. Some embodiments provide that documents may be electronically notarized using, for example, an e-notary. As used herein, an e-notary may include a notary public who notarizes documents electronically. For example, an e-notary may use a digital signature and/or a digital notary seal to notarize digital documents and validate with a digital certificate. In this regard, electronic notarization may include a process in which a notary affixes an electronic signature and notary seal to an electronic document using a secure public key. Once affixed to the electronic document, the documents may be rendered tamper evident in that unauthorized attempts to alter the electronic document will be evident to relying parties. An e-notary may use cryptography and/or public key infrastructure to create manage, distribute, use, store and/or revoke the digital certificate.

Some embodiments provide that a paper version of the document can be scanned and/or photographed and then uploaded. For example, an application may include options to choose from such as "PRINT", "SCAN", "SIGN AND NOTARIZE" AND "UPLOAD", among others. Some embodiments provide that the application may prompt a signing party to photograph pages in succession and then compile the images into a single document file that can be uploaded to the data repository. Some embodiments provide that the PRINT option may cause an encoded image to be placed on one or more pages of the document. Examples of encoded images include barcodes and/or quick response (QR) codes that include data corresponding to the document type and/or number, file number and/or transaction number, among others. The encoded data may allow the document to be routed to a corresponding portion of the data repository.

Some embodiments provide that the signing may be performed in the presence of a notary or other certifying official. In some embodiments, the notary may be present at the location of the signing party during the signing session. Some embodiments provide that the notary may be present via an image/video capture device, such as a webcam. In this regard, the notary may witness a substantially live feed of the signing operation remotely and then electronically and/or physically affix the notorial stamp, statement and/or signature.

Some embodiments provide that a visual image of the signing party may be captured via an image capture device on a device such as a mobile terminal or other computing device that is proximate the signing party. For example, the image capture device may be automatically tuned and/or selected to capture the actual signing in a signing video, which may also be communicated to other authorized viewers and/or participants.

In some embodiments, uploaded scanned images and/or video of signed documents may be received via the mobile terminal device.

In some embodiments, the signing party is in the presence of a signature certifying agent. One non-limiting example of a signature certifying agent includes a notary of the public, however, other signature certifying agents are contemplated herein. Some embodiments provide that the signing party is remotely located from a signature certifying agent and that a visual image of the signing party is captured via the image capture device such that the actual signing is captured in a signing video. The signing video may be communicated to the signature certifying agent and a signature certification may be received from the signature certifying agent. Some embodiments provide that the signature certification may be received as an image of a certified document that is executed by the signature certifying agent.

Figure 2:
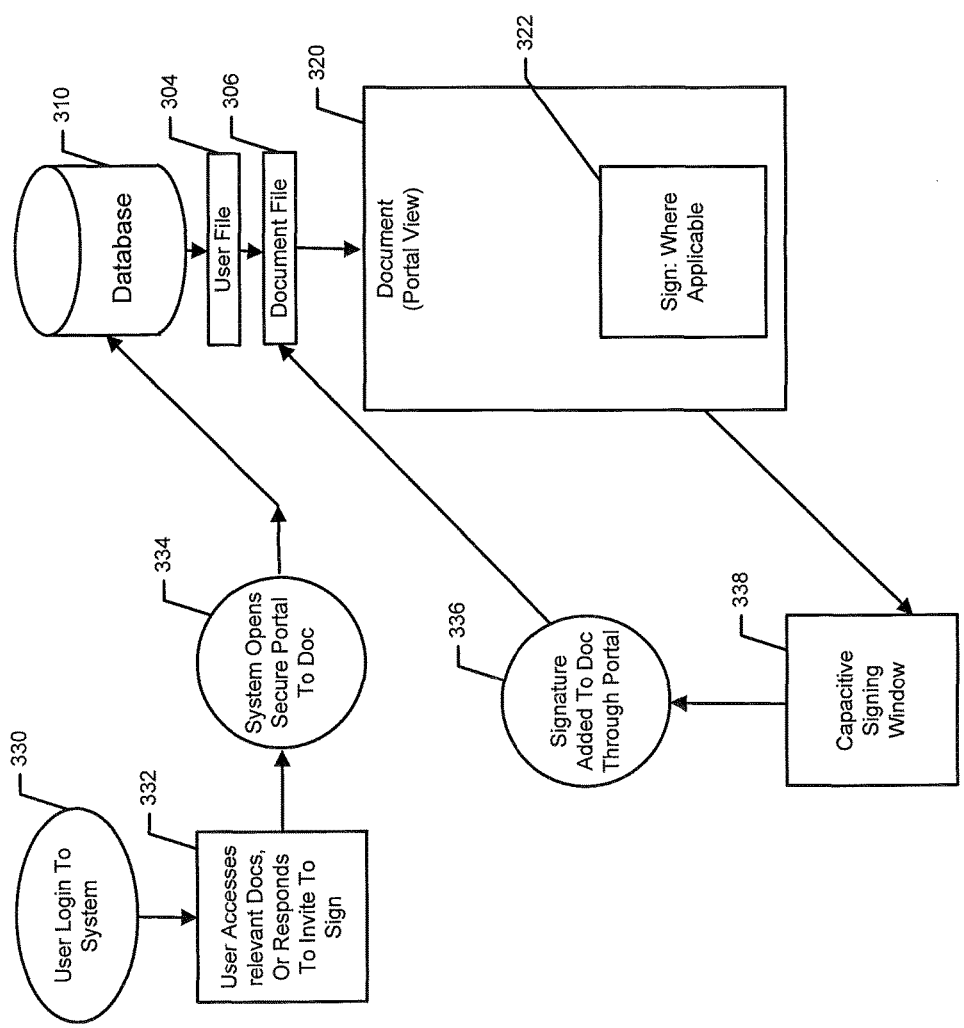
FIG. 2 is a block diagram illustrating operations and structures for remote signing and transfer of signatures to an electronic document according to some embodiments of the present inventive subject matter.

Reference is now made to FIG. 2, which is a block diagram illustrating operations and structures for remote signing and transfer of signatures to an electronic document according to some embodiments of the present inventive subject matter. A user may log into a system or service (block 330). The user may access relevant documents and/or may respond to an invitation to sign a document by another party (block 332). The system or service may open a secure portal to the document to be signed (block 334). In some embodiments, the document may be stored as a document file 306 stored in association with a user file 304 in a database 310 or other data repository.

The portal view 320 of the document may display, among other contents, a signature space 322 that is operable to receive a signature from the user. In some embodiments, the signature may be received through a capacitive signing window of a device user interface. The signature may be added to the document through the portal 320 and the document file may be updated. Once all of the signatures, including multiple signatures of the same signor and/or different signors, are received, the document may be finalized and saved as a read-only document.

Figure 3:
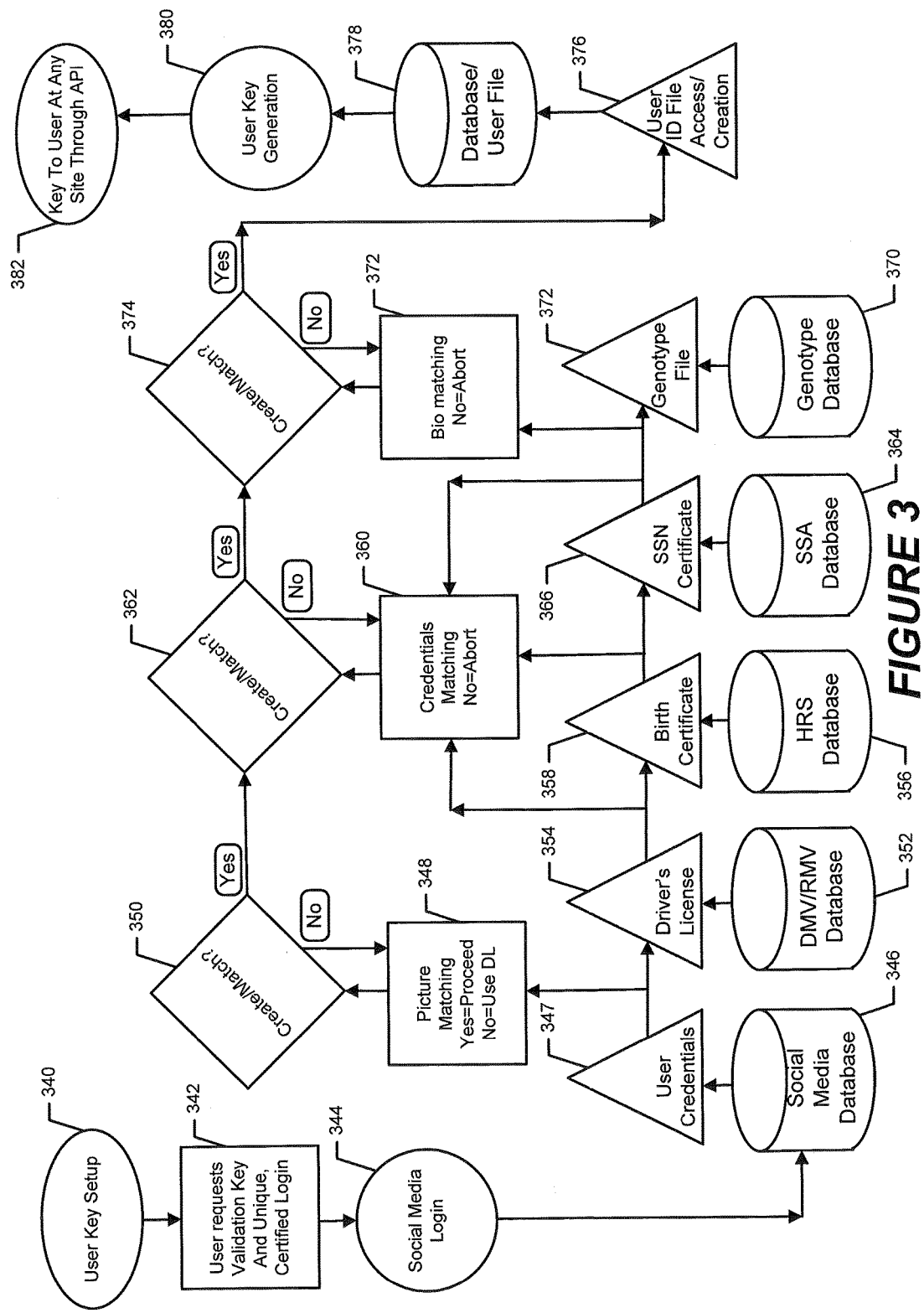
FIG. 3 is a block diagram illustrating operations and structures for validating a user for remote document execution of an electronic document according to some embodiments of the present inventive subject matter.

In order to provide secure execution of signed documents, user identities may be validated. In this regard, reference is now made to FIG. 3, which is a block diagram illustrating operations and structures for validating a user for remote document execution of an electronic document according to some embodiments of the present inventive subject matter. A user may commence a user key setup operation (block 340). The user may request a validation key and a unique login that may be certified (block 342). In some embodiments, the validation may be performed based on social media login data (block 344). Data from a social media database 346 may be used to determine user credentials (block 347). The social media user credentials may be evaluated to determine data matches (block 348). For example, some embodiments provide that pictures in the social media may be analyzed to identify matches to an image of the user. If a match is identified (block 350), then operations for creating a user login may proceed.

If a match is not identified (block 350), then the validation process may then evaluate any one or more of a variety of identifying documents. For example, driver's license data 354 from a DMV/RMV database 352, a birth certificate 358 from a historical records survey type database 356 and/or a social security number certificate 366 from a social security administration type database 364. If a match is identified (block 362), then operations for creating a user login may proceed. If there are no matches or if the evaluation does not conclusively identify a match, then the validation process may be terminated or may be continued by evaluating biometric data from a genotype file 368 in combination with a genotype database 370. If a match is identified (block 374), then operations for creating a user login may proceed and a user identification file may be accessed and/or created (block 376).

A database 378 may be accessed and/or populated and a user key may be generated (block 380). The user key may be used to access the systems and perform operations disclosed herein from any site using a corresponding application programming interface (API) (block 382).

Figure 4:
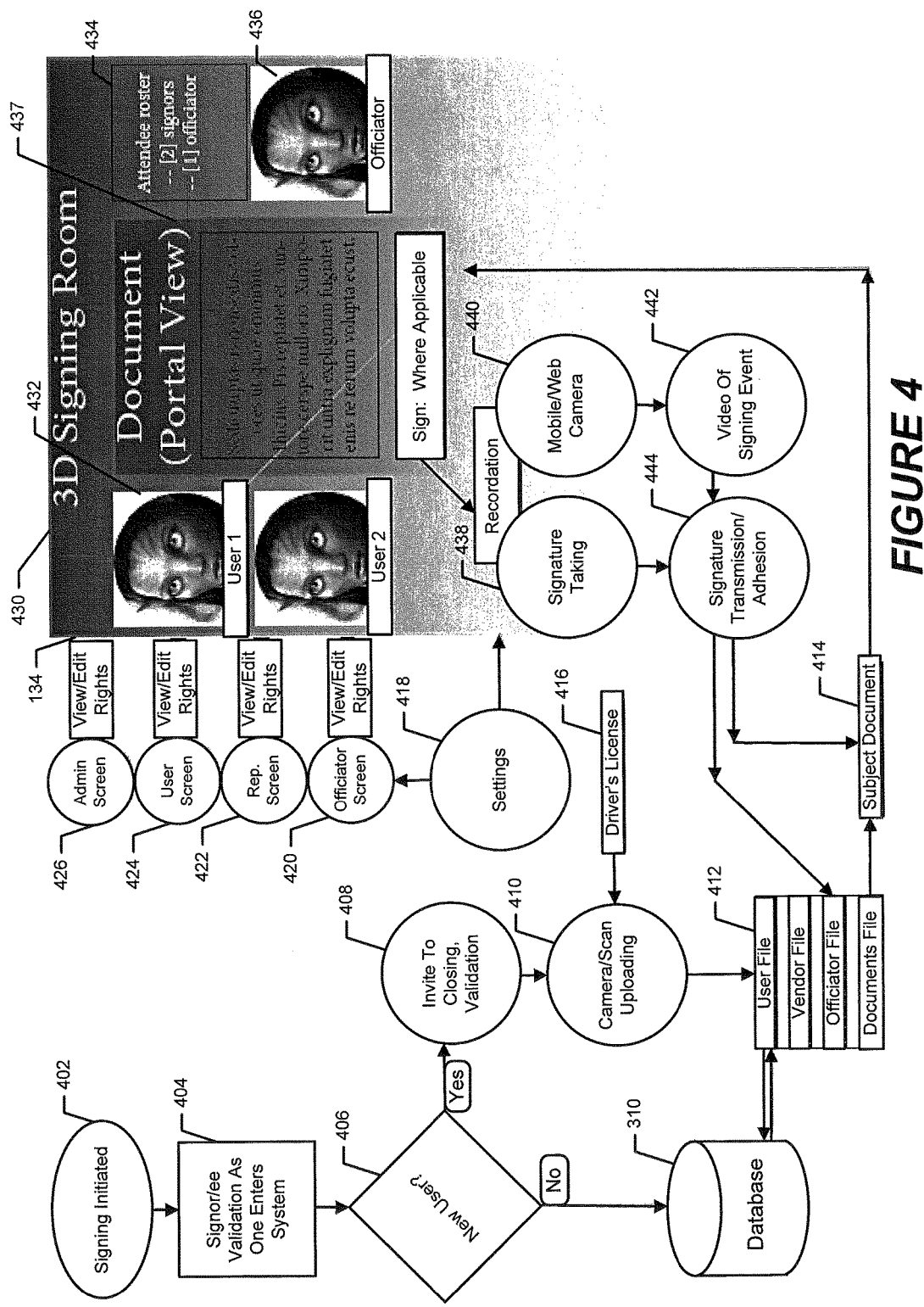
FIG. 4 is a block diagram illustrating operations and structures for a virtual signing room for remote document execution of an electronic document according to some embodiments of the present inventive subject matter.

Once a user is validated for secure remote execution of the document, then a virtual signing room may be generated. Reference is now made to FIG. 4, which is a block diagram illustrating operations and structures for a virtual signing room for remote document execution of an electronic document according to some embodiments of the present inventive subject matter. In some embodiments, the signing may be initiated by one or more parties via the systems and methods disclosed herein (block 402). A signor and/or signee may be validated as they enter the system (block 404). A determination is made as to whether the signor/signee is a new user (block 406). If the signor/signee is a new user, then they may be invited to closing or other document execution and a user validation process (block 408). A camera or other scanning device may capture and upload images of the user and/or any supporting identification documents, such as a driver's license 416, to validate the user (block 410). The uploaded images may be stored in association with a documents file, a user file, a vendor file and/or an officiator file in a database 310.

A graphical user interface may illustrate a virtual signing room 430 that may be displayed on a computing device at one or more locations that are different from one another and from the location of the electronic document to be executed. For example, multiple different signors may be at different locations and may each securely sign the electronic document. The virtual signing room 430 may provide different user configurable settings 418 that may be adjusted by different participants. For example, different settings and/or types thereof may be adjusted by an administrator via an administrator screen 426, a user via a user screen 424, a representative via a representative screen 422 and/or an officiator via an officiator screen 420. Each of the different screens may display and/or include the edit rights and/or capabilities of the different types of participants.

The virtual signing room 430 may include graphical representations corresponding to different ones of the signing participants. For example, some embodiments provide that different signors or other users may be represented by avatars 432. In some embodiments, the avatars 432 may each be modified to include image data, such as a picture, corresponding to and/or of the associated user. Some embodiments provide that non-signing parties, such as an officiator 436 and/or witnesses may be graphically represented in the virtual signing room as avatars that may be optionally modified to include corresponding image data. Some embodiments provide that the image data of a signor and/or a non-signing participant may also include a corporate or other organizational and/or entity logo or image. An attendee roster 434 may also be displayed in the virtual signing room 430 and may list all of the participants of the signing session and/or their respective roles.

A portal view 437 of the subject document 414 may be displayed including a graphical representation of a signature space 322. A mobile and/or web-based camera 440 may be used to record the signature taking 438 and a video of the signing event may be generated (block 442). The signatures may be transmitted and included in the subject document 414 (block 444). Once the signatures have been included in the subject document 414, the document may be reviewed for completeness before saving as a non-readable document.

In some embodiments, the virtual closing room may include pre-saved animations representing common events that occur at a closing, ones of which may be either completed using HOT KEYS or may be generated using methods, systems and program products disclosed herein. For example, one or more of these types of events may be automatically generated based on an expected occurrence corresponding to one or more of the participants to give the participant the impression physically, mentally, psychologically and/or behaviorally that they are in a closing room. In this regard, a similar feeling to a physical signing experience may be provided. In some embodiments, a participant may be able to control via one or more user interface inputs, their experience to turn on, initiate, stop, pause and/or change features corresponding to one or more activities and/or events. For example, the virtual closing room may generate graphics and/or sounds corresponding to the arrival of a participant in a closing, such as exiting an elevator or arriving to an office and entering a reception area, receiving a greeting from receptionist, complete with the virtual receptionist extending his/her hand, shaking the participant's hand and leading them into the closing room. A virtual receptionist may lead a participant to a graphic of a safe where a code may be entered to receive confidential documents to take to the closing table for signing.

A virtual human or system generated avatar may ask a participant what they would like to drink and serve the "eDrink". The system generated avatar may further circumnavigate the closing room and perform tasks for participants. In some embodiments, the virtual closing room may generate graphics and/or sounds corresponding to exiting a closing room, putting documents back in the safe and/or watching an animation of the safe securing the documents, including, for example, the sound of a safe dial clicking, the sound of a safe closing and/or a graphical depiction of a security measure being put in place. In some embodiments, the virtual closing room may generate graphics and/or sounds corresponding to exiting including someone virtually escorting you to front door and/or to an elevator. In some embodiments, the virtual closing room may provide the ability to use a HOT KEY to have a private meeting with another participant, such as an attorney or other advisor virtually. Animation may take a participant into another room or corner of room where the participant may CHAT and/or have live video chat with another participant face-to-face in the virtual closing room. In this manner, a participant may experience the sensation of being in a real signing room during document execution.

In some embodiments, the virtual closing room may generate graphics and/or sounds corresponding to current and/or desired weather conditions. In some embodiments, weather condition graphics and/or sounds may be generated based on data generated by one or more weather data sources, including, for example, a real or substantially real-time weather data feed. The weather data feed may correspond to weather at the location of one or more of the participants and/or a location remote therefrom. Some embodiments provide that weather condition graphics may be generated based on predetermined weather conditions that may be selected by one or more participants.

Figure 5:
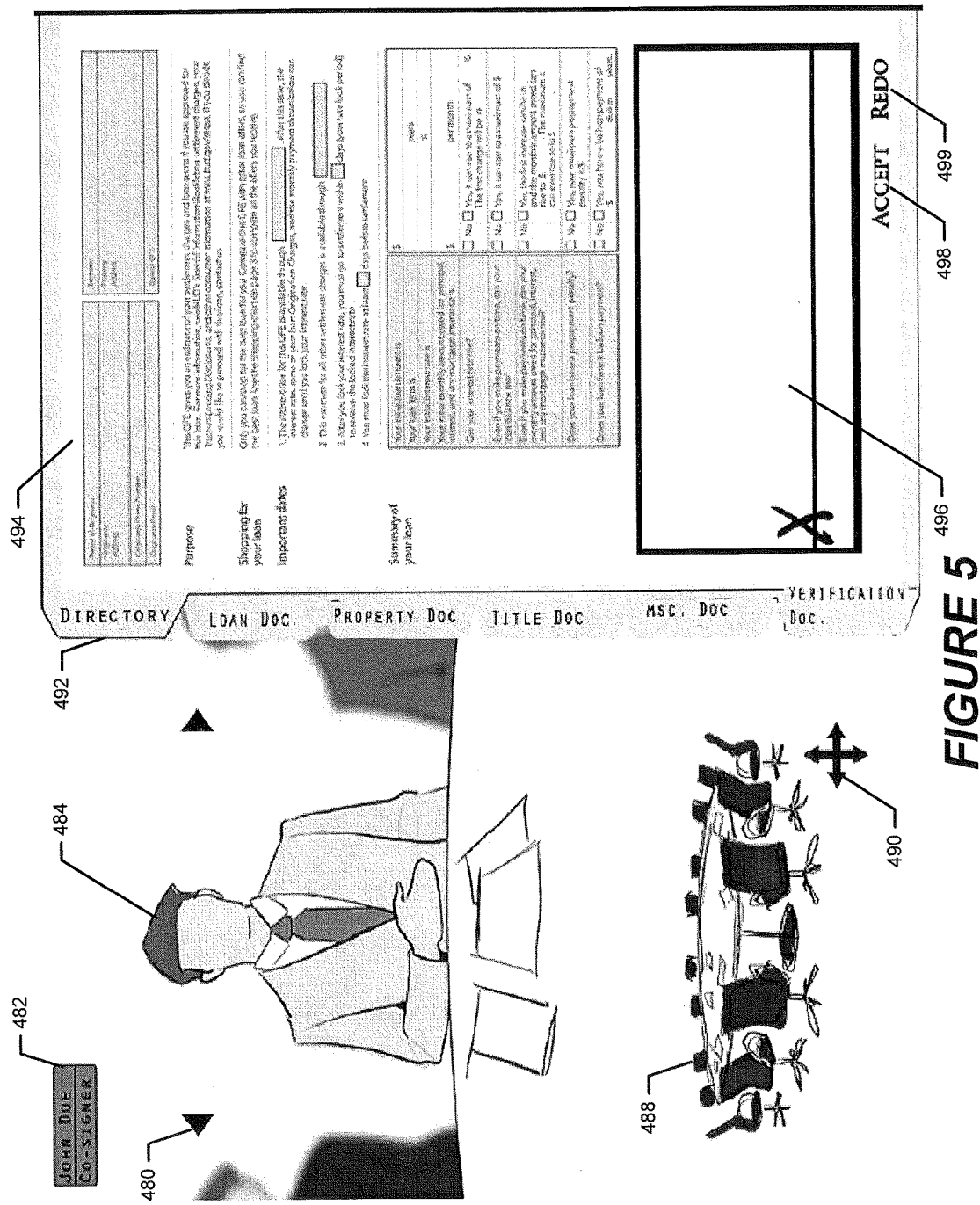
FIG. 5 is a diagram illustrating a graphical representation of a user interface corresponding to a virtual signing room for remote document execution of an electronic document according to some embodiments of the present inventive subject matter.

Reference is now made to FIG. 5, which is a diagram illustrating a graphical representation of a user interface corresponding to a virtual signing room for remote document execution of an electronic document according to some embodiments of the present inventive subject matter. In some embodiments, the virtual signing room interface may include a depiction of a meeting setting 488 in which signing session participants may be graphically represented. In some embodiments, each of the participants is represented as gathered around a table, however, such embodiments are non-limiting. The meeting setting graphics may be dynamic and the view therein may be changed using a user controlled navigational input 490 of the graphical user interface.

Some embodiments provide that the graphical representation may include individual signing session participant representations 484. In some embodiments, ones of the signing session participant representations 484 may include a configurable portion 486 that may be modified to include a graphic that corresponds to the individual participant. A signing session participant identifier 482 may be provided to identify a name and/or a role in the signing session. Navigational user inputs 480 may be provided to provide functionality for changing which of the signing session participant representations 484 is viewed.

In some embodiments, the virtual signing room interface may include a display of the document 494. The displayed document may include the text portions and a graphic corresponding to signature spaces 496. The signature space graphic 496 may be used as a user input in which the signature may be received directly via a touch sensitive portion of the display. Once the signature is received into the signature space 496, the user may be given the option to accept 498 or redo 499 the signature.

Figure 6:
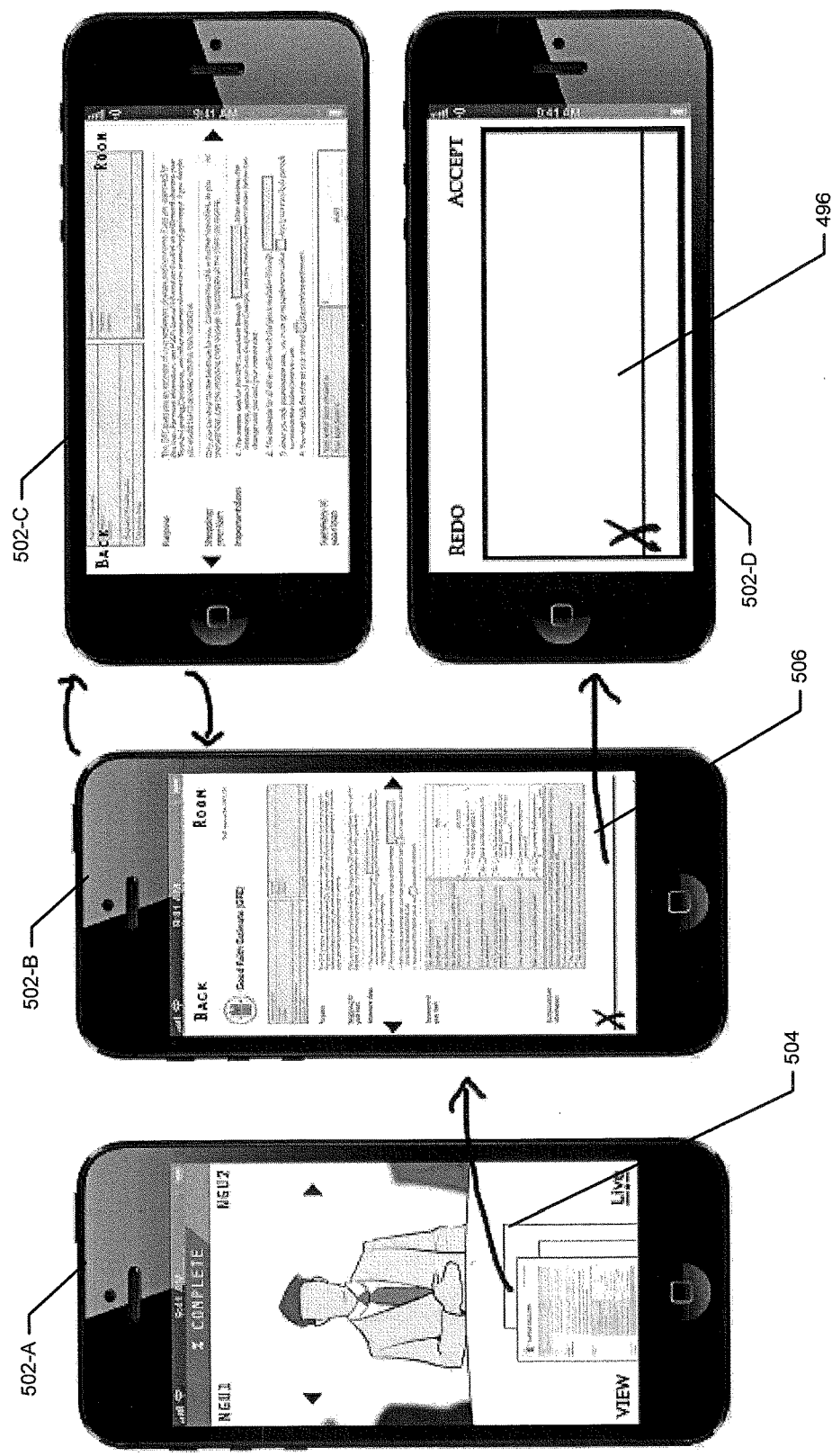
FIG. 6 is a diagram illustrating a graphical representation of a user interface corresponding to a virtual signing room for remote document execution of an electronic document using a handheld mobile terminal according to some embodiments of the present inventive subject matter.

The virtual signing room interface may include significant content and thus a larger screen may be beneficial to view the contents thereof in a single view. In this regard, different portions of the virtual signing room interface may be viewed individually if the screen size is not sufficient to practically view the entire virtual signing room. In this regard, brief reference is now made to FIG. 6, which is a diagram illustrating a graphical representation of a user interface corresponding to a virtual signing room for remote document execution of an electronic document using a handheld mobile terminal according to some embodiments of the present inventive subject matter.

In some embodiments, the virtual signing room on a handheld device may include a primary portion of the display in which active components of the signing session are displayed and a secondary portion in which reduced representations of subsequent components of the virtual signing room are displayed. For example, the screen displayed in image 502A includes the graphical representations of individual signing session participants (484, FIG. 5) as the primary portion and a reduced size display of the document (494, FIG. 5) as the secondary portion. Some embodiments provide that selecting the secondary portion causes that component of the virtual signing room to be displayed in the primary portion, as illustrated in image 502B.

In the document display mode, the handheld device may be manipulated to change the orientation of the image displayed thereon to facilitate a view having increased visibility at a higher level of granularity. Similarly, touch gesture zoom control features may be used to further magnify portions of the displayed document. Image 502D illustrates that the handheld device may display the signature space 496 in addition to the redo and accept user inputs. In this manner, the signing session may be completed via a handheld device.

Figure 7:
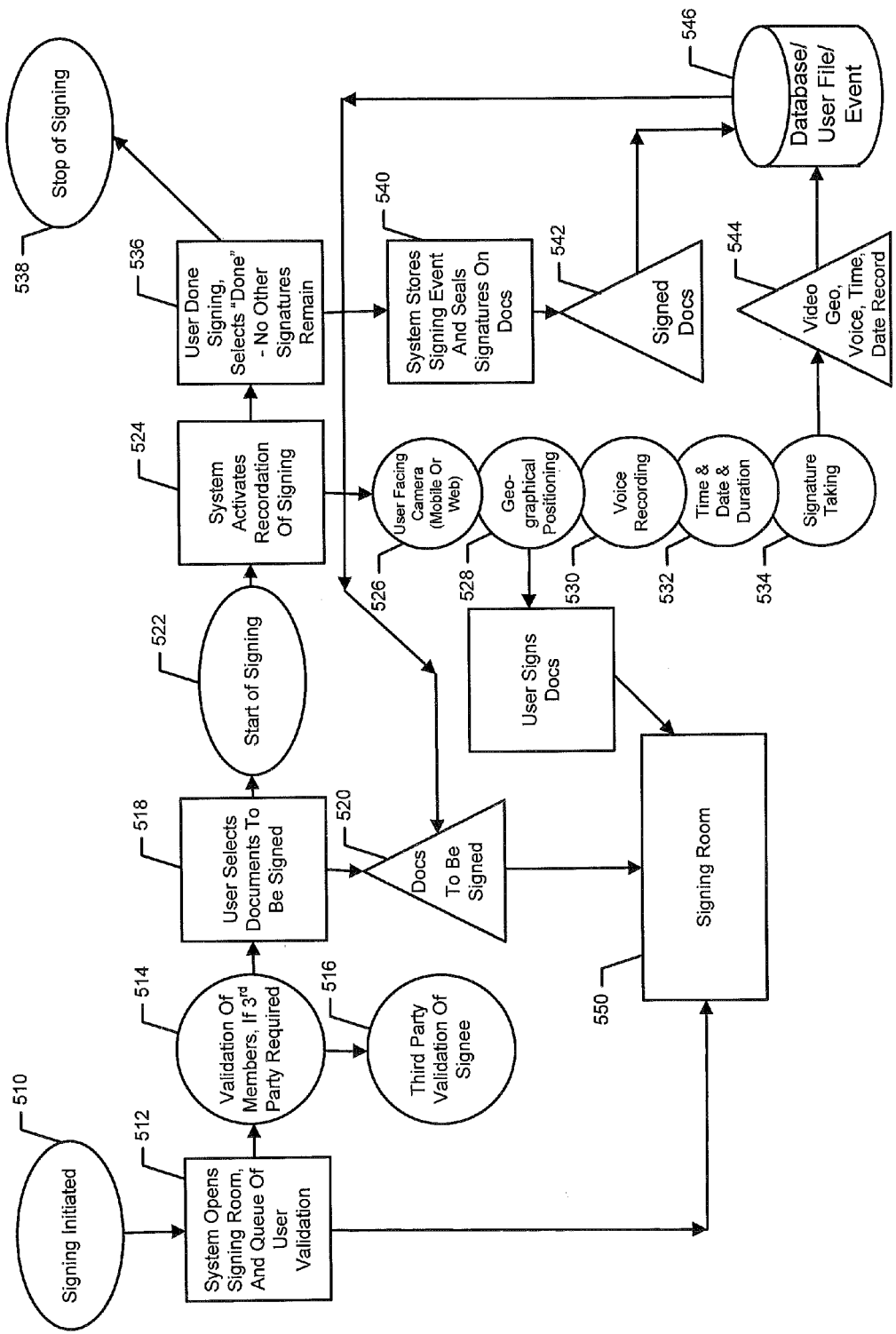
FIG. 7 is a block diagram illustrating operations and structures for a virtual signing room for remote document execution of an electronic document according to some embodiments of the present inventive subject matter.

Reference is now made to FIG. 7, which is a block diagram illustrating operations and structures for a virtual signing room for remote document execution of an electronic document according to some embodiments of the present inventive subject matter. Some embodiments provide that the signing session is initiated 510 and the signing room 550 opens and a queue of user validation operations may commence (block 512). Some embodiments provide that validation operations are performed (block 514). In some embodiments, a third party validation of one or more signing parties may be performed (block 516).

Once the validation operations are completed successfully, a user may select the document(s) for execution (block 518). The document(s) 520 may be sent to and/or made available to the signing room module 550. The signing operations may begin (block 522). During and/or before the signing, the user image may be captured by a camera (mobile device and/or web camera) that the user is facing (block 526). In some embodiments, geographical positioning data of the user may be determined (block 528), a voiced recording of the user may be generated (block 530), the time and/or duration of the signing operations may be recorded (block 532), and the signature may be received 534, all as the user signs the document(s) (block 525). The video, geo-location, voice, time, duration and/or date record 544 may be saved in the database 546 in association with the user file and/or event.

Signing operations may be performed and the user may select "Done" to indicate that no other signatures remain (block 536). The signing operations may be stopped (block 538) and the signing event may be stored and the signatures on the document(s) may be sealed (block 540). The signed documents 542 may be stored in the database 546.

Figure 8:
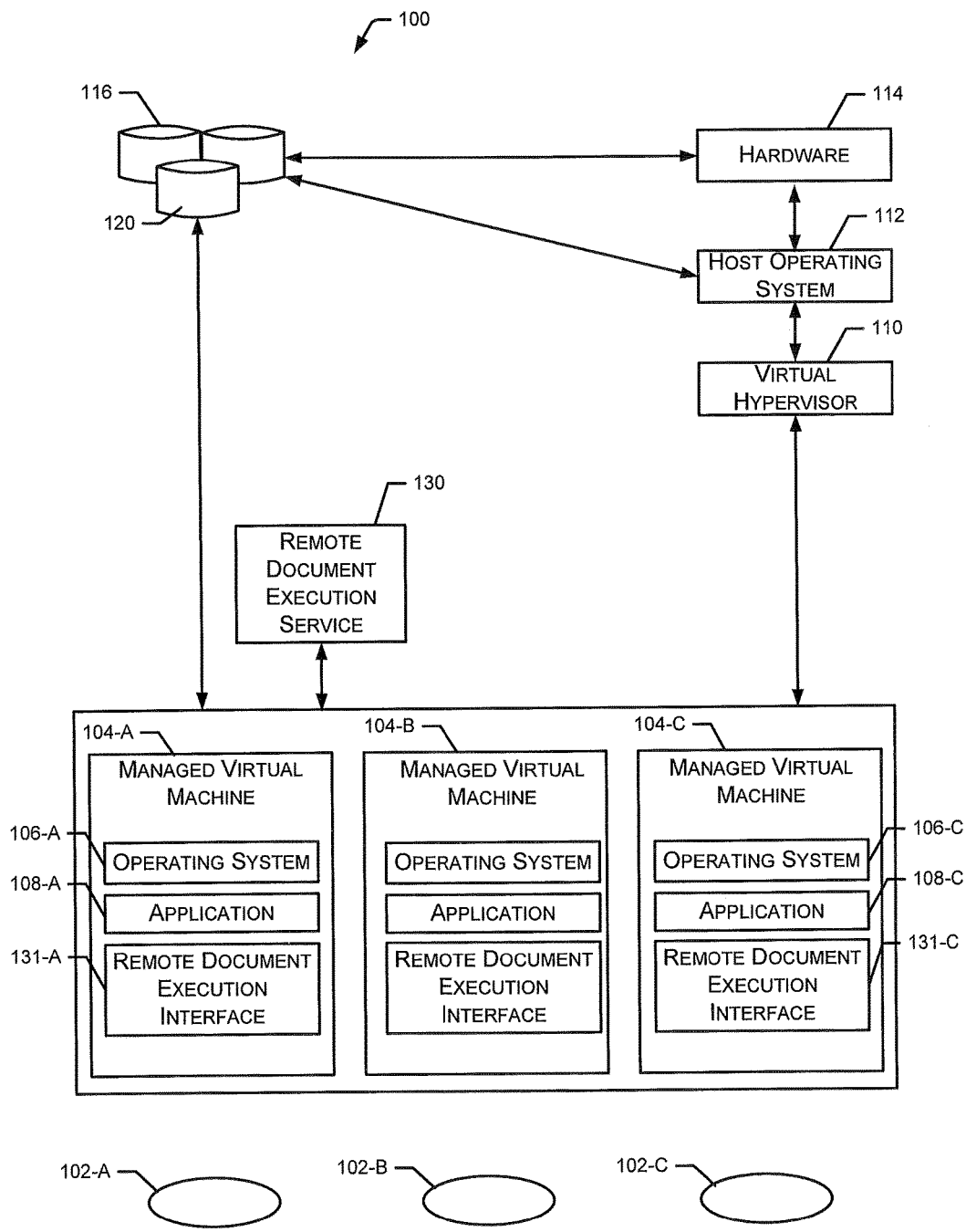
FIG. 8 illustrates a virtual computing environment according to some embodiments of the present inventive subject matter.

Reference is now made to FIG. 8, which illustrates a virtual computing environment according to some embodiments of the present inventive subject matter. The computer system 100 generally hosts and manages one or more virtual machines (hereafter managed virtual machine, or managed machine), each of which runs a guest operating system 106 and application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), including, but not limited to the AMD Athlon™ 64, or Intel® Core™ Duo, among others.

The hardware platform 114 may be further connected to the data storage space 116 through serial or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the virtual machines 104 present a virtualized environment to the guest operating systems 106, which in turn provide an operating environment for applications 108 and other software constructs.

Applications 108 that are implemented on the virtual machines 104 may be configured to access one or more data sources in accordance with the functions thereof. As discussed herein by way of example, a data source may be a file, however, the disclosure is not so limited. For example, database applications and/or applications that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

A remote document execution service 130 that is operable to perform operations and functions described herein may be provided to provide remote document execution of electronically managed documents for various users 102. A user 102 may interface with the remote document execution service 130 via a remote document execution interface 131 that includes graphical representations and user inputs for remotely executing an electronically stored document. In some embodiments, the remote document execution service 130 is an application that is configured to be executed on a handheld computing device, such as, for example, a mobile terminal, among others.

Figure 9:
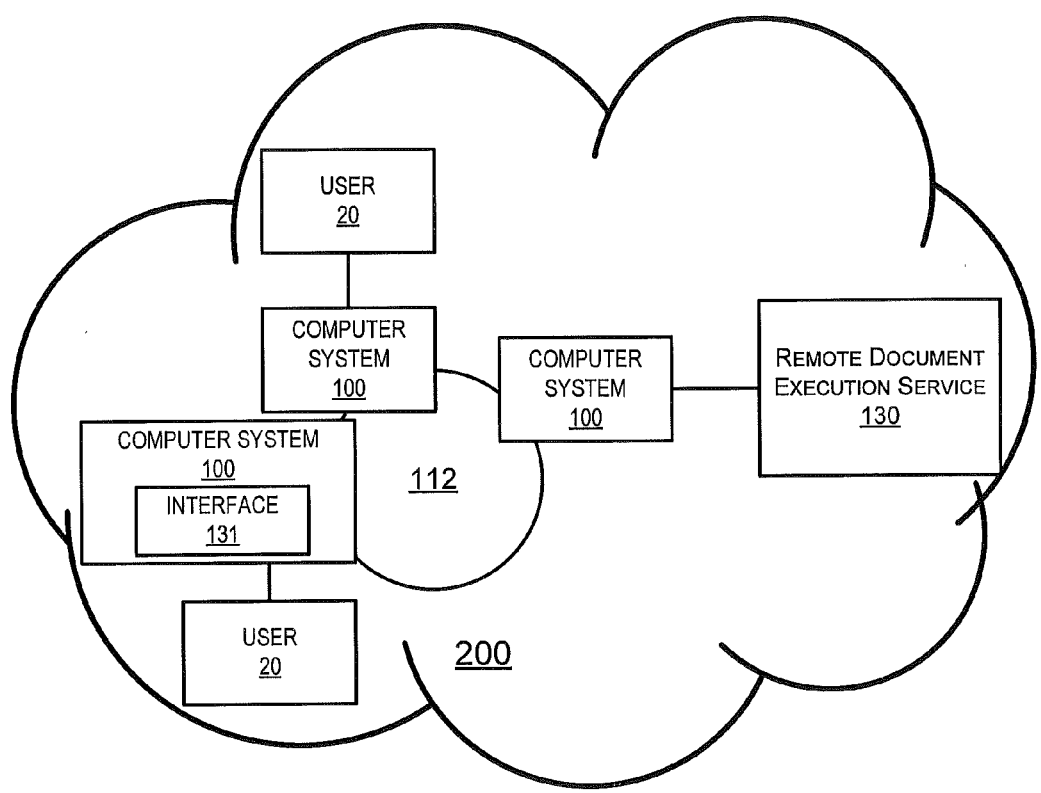
FIG. 9 illustrates a virtual computing environment according to some embodiments of the present inventive subject matter.

Reference is now made to FIG. 9, which illustrates a virtual computing environment according to some embodiments of the present inventive subject matter. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, electronic gaming device and/or system, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 9 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also referred to herein as "grids". A virtualization environment in the cloud 200 may be managed by a single hypervisor 110, or a set of hypervisors 110.

In some embodiments, the computer system 100 includes an interface 131, such as the remote document execution interface 131 described above in reference to FIG. 8.

Figure 10:
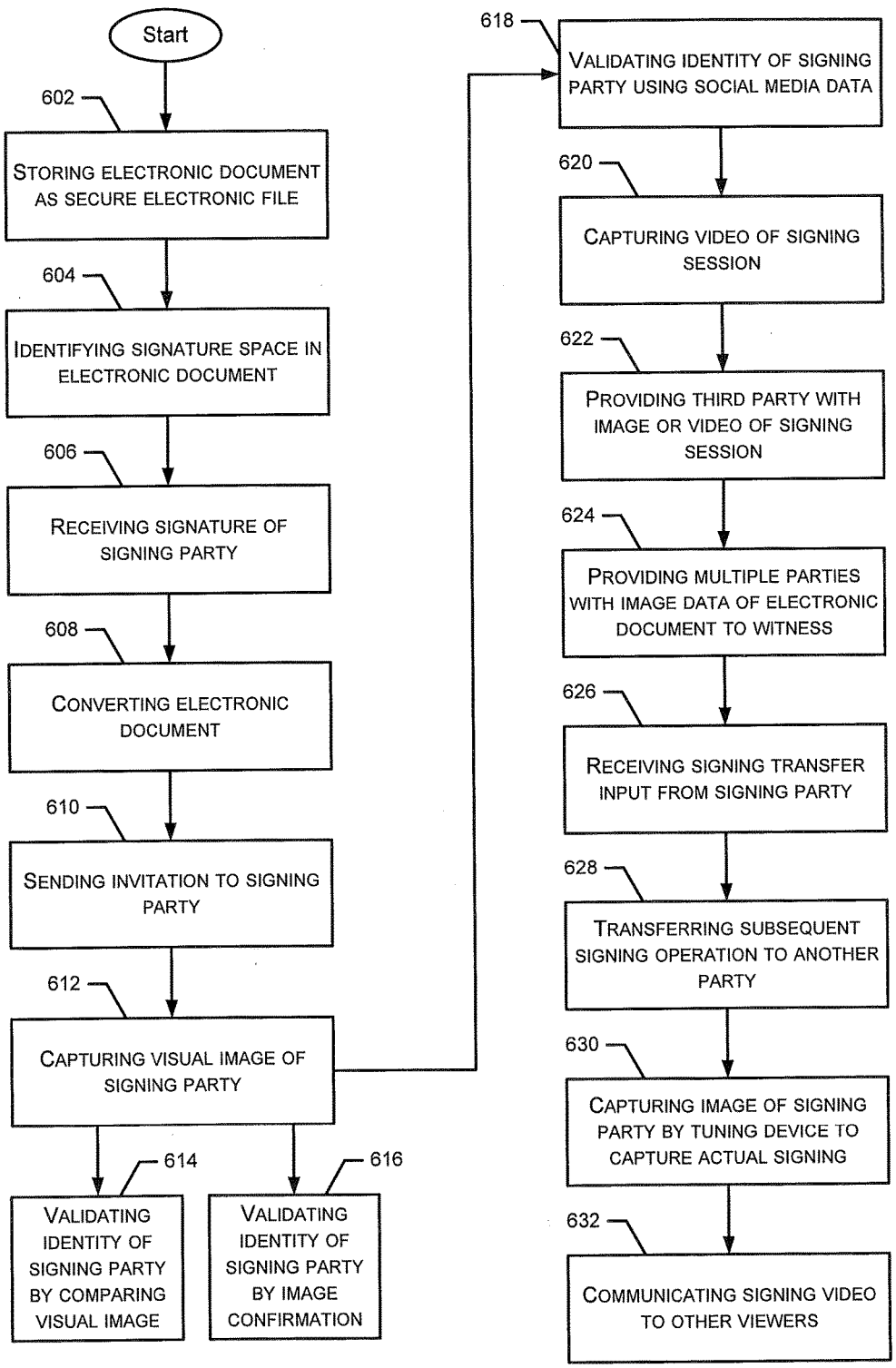
FIG. 10 is a block diagram illustrating operations for remote document execution of an electronic document according to some embodiments of the present inventive subject matter.

Reference is now made to FIG. 10, which is a block diagram illustrating operations for remote document execution of an electronic document according to some embodiments of the present inventive subject matter. An electronic document may be stored as a secure electronic file (block 602). The secure electronic file may be stored as a single instance and may be modified responsive to receipt of data corresponding to the signature of a signing party.

One or more signature spaces may be identified in the electronic document (block 604). After the electronic document is executed, each of the signature spaces may include a signature of a signing party of the electronic document. For example, a borrower may execute a loan contract in conjunction with making a large purchase, such as a house or automobile, among others. The signature of the signing party may be received into the electronic document stored as the secure electronic file (block 606). Some embodiments provide that the signature of the signing party is received during a signing session. Some embodiments include providing access to the electronic document to the signing party and/or a non-signing party as a preview before the signing session. Responsive to receiving the signature of the signing party, the electronic document may be converted into a read only electronic document (block 608). Some embodiments provide that there are multiple instances of the signature that are each received by different signature spaces through corresponding different signing activities performed by the signing party.

An invitation may be sent to the signing party inviting the signing party to participate in a signing session (block 610). Some embodiments provide that the invitation is sent via a secure link. In some embodiments, the signing session is accessed via a secure link.

Some embodiments include capturing a visual image of the signing party via an image capture device on device that is proximate the signing party (block 612). An identity of the signing party may be validated by comparing the visual image of the signing party to an image from a signing party document (block 614). Non-limiting examples of a signing party document may include a file photograph of the signing party and/or an image of an identification document, among others. The identity of the signing party may be validated by receiving an identification confirmation from another party that verifies that the visual image corresponds to the signing party (block 616).

In some embodiments, the identity of a signing party may be validated using social media data corresponding to one or more of a variety of social media services (block 618). Examples of the social media data may include social media login data, a photograph and/or personal data, among others.

A video of the signing session may be captured via an image capture device on a signing session device (block 620). Some embodiments include providing a third party with an image or video of a signing session via an image capture device camera on the signing session device (block 622). The third party may be provided with an input field that is configured to receive an endorsement of the signature. In this manner, a third party may endorse a signing party signature via images and/or video received and/or transmitted during a virtual signing session.

Some embodiments include providing multiple different parties with image data corresponding to the electronic document to witness the signing session from a location other than a location of the signing party (block 624). A signing transfer input may be received from the signing party (block 626) and a subsequent signing operation may be transferred to another signing party responsive to receiving the signing transfer input (block 628).

Some embodiments include capturing a visual image of the signing party via an image capture device on a device that is proximate the signing party by automatically tuning the image capture device to capture the actual signing in a signing video (block 630). The signing video may be communicated to other viewers (block 632). Uploaded scanned images and/or video of signed documents may be received via the device, which may include, for example, a mobile terminal. In some embodiments, the signing video captures a signature speed, a signature cadence, and/or forensic signature data corresponding to each occurrence of a signature.

Figure 11:
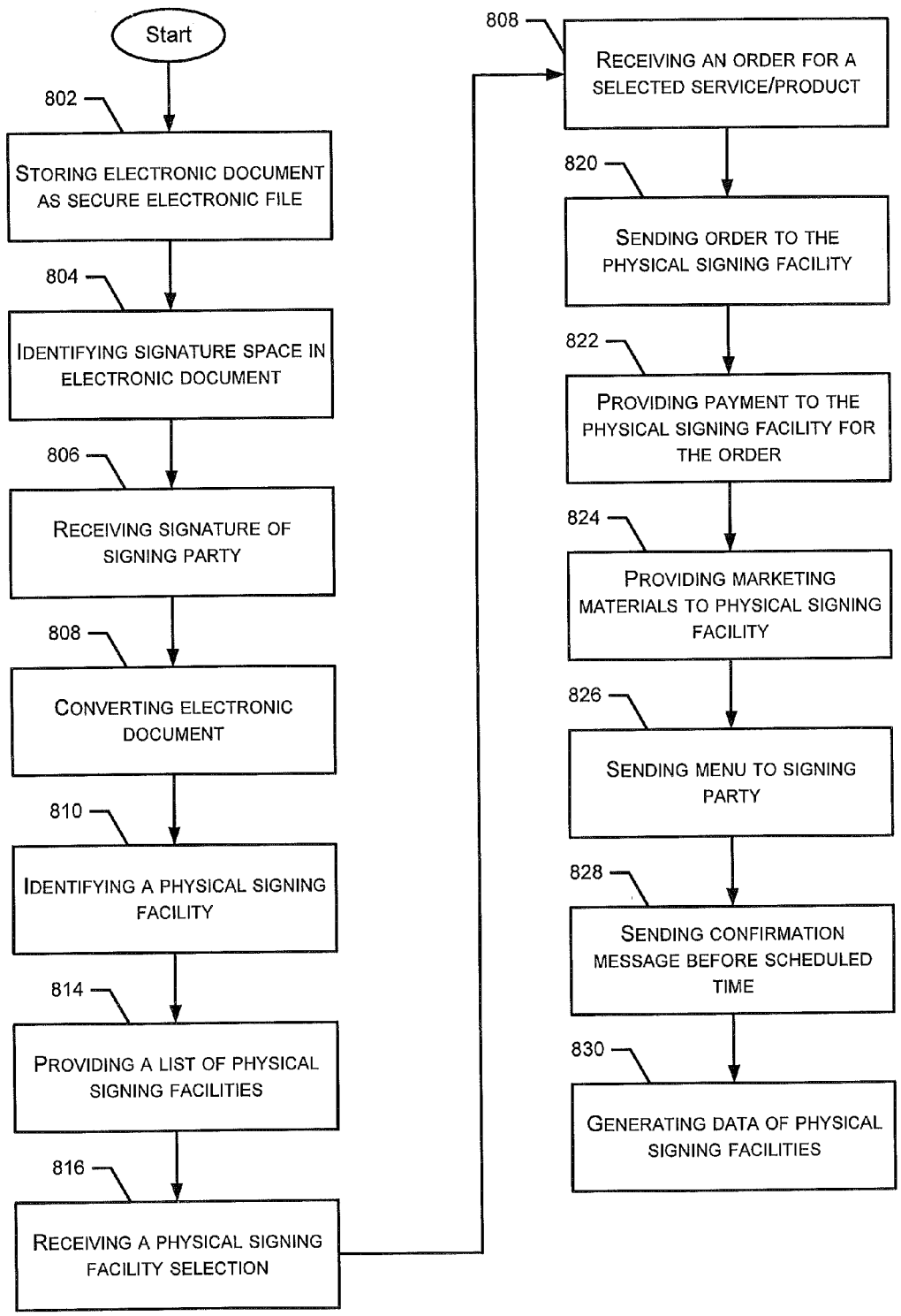
FIG. 11 is a block diagram illustrating operations for remote document execution of an electronic document according to some embodiments of the present inventive subject matter.

FIG. 11 is a block diagram illustrating operations for remote document execution of an electronic document according to some embodiments of the present inventive subject matter. An electronic document may be stored as a secure electronic file (block 802). The secure electronic file may be stored as a single instance and may be modified responsive to receipt of data corresponding to the signature of a signing party.

One or more signature spaces may be identified in the electronic document (block 804). After the electronic document is executed, each of the signature spaces may include a signature of a signing party of the electronic document. For example, a borrower may execute a loan contract in conjunction with making a large purchase, such as a house or automobile, among others. The signature of the signing party may be received into the electronic document stored as the secure electronic file (block 806). Some embodiments provide that the signature of the signing party is received during a signing session. Some embodiments include providing access to the electronic document to the signing party and/or a non-signing party as a preview before the signing session. Responsive to receiving the signature of the signing party, the electronic document may be converted into a read only electronic document (block 808). Some embodiments provide that there are multiple instances of the signature that are each received by different signature spaces through corresponding different signing activities performed by the signing party.

In some embodiments, a physical signing facility that provides services and/or products that are unrelated to a subject matter of the electronic document may be identified (block 810). Some embodiments provide that a list of a plurality of physical signing facilities may be provided to the signing party (block 814). In some embodiments, the list may be based on a known or expected location of the signing party at the time of a scheduled signing session. For example, the list of physical signing facilities provided for a mid-day signing session may be different than the list of physical signing facilities provided for a late-day signing session based on the different locations of the signing party at the different respective times of day. Similar distinctions may be made based on which day of the week the signing session is scheduled for. A selection corresponding to the physical signing facility may be received from the signing party (block 816).

In some embodiments, an order for a selected service and/or product may be received from the signing party (block 818) and the order may be sent to the physical signing facility (block 820). Sending the order to the physical signing facility may include sending an identification for the selected service and/or product and/or a graphical representation of the signing party. In this manner, the signing party may be identified by physical signing facility personnel or employees upon arrival and have their selected service and/or product delivered without prompting by the signing party.

In some embodiments, a menu of services and/or products is sent to the signing party (block 826). The menu may be specific to a specific physical signing facility and/or may be a generic menu that corresponds to a type of service and/or product provided by the physical signing facility.

Payment for the selected service and/or product may be sent to the physical signing facility (block 822). In some embodiments payment may be provided to the physical signing facility in the form of an account to which the physical signing facility may charge for the selected service and/or product. Some embodiments provide that the payment is provided as an electronic value transfer such as money or other redeemable assets such as Bitcoin.

Marketing materials that are configured to accompany the selected service and/or product and/or that are configured to be displayed on a premises of the physical signing facility may be provided to the physical signing facility (block 824). In this manner, the physical signing facility may be identified to non-signing parties as a location for a future signing session. Additionally, awareness regarding the remote document execution services may be increased.

A confirmation message may be sent to the signing party a given time before a scheduled time for a planned signing session (block 828). The confirmation message may include identification of the selected service and/or product and/or directions to the physical signing facility, among others.

Some embodiments provide that a searchable data file of physical signing facilities and corresponding locations may be generated (block 830). In this manner, physical signing locations may be identified based on one or more different criteria.

Figure 12A:

Reference is now made to FIGS. 12A and 12B, which are images depicting screen shots of a virtual signing room graphical user interface according to some embodiments of the present inventive subject matter. As illustrated in FIGS. 12A and 12B, graphical representations of the virtual signing table, documents and at least one participant are illustrated. Some embodiments provide that a view corresponding to the virtual closing room may be selected by a user and may be shared with or exclusive to each participant in the virtual signing room. For example, a first user may select a metropolitan skyline as illustrated in FIGS. 12A and 12B, while another user may select another scene such as a natural outdoor scene including features such as waterfalls, oceans, beaches, mountains, etc.

Referring to FIG. 12A, some embodiments include one or more user interface inputs that may be used to control the appearance and/or view in the virtual signing room. For example a scene lighting input 704 may receive a user input to adjust a lighting level in the virtual signing room. A camera input 706 may receive a user input to adjust and/or control a camera and/or view in the virtual signing room. A navigation interface 702 may receive a user input to change the view of the virtual signing room. In some embodiments, the navigation interface may include different components corresponding to different perspectives in the room. For example, the relative locations of the different participants may be designated by different colors and/or other graphical enhancements, such as symbols, shapes and/or fill and/or edge patterns.

Referring to FIG. 12B, some embodiments may include a depiction of participant activity at the virtual signing table such as reviewing and/or signing a document by graphically showing an avatar representing a reviewing and/or signing party performing a reviewing and/or signing operation.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Some embodiments provide that one or more of the programs may be executed during a portion of execution of another one of the programs in the corresponding process operation.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer system, comprising:
   a processor; and
   a memory coupled to the processor, the memory comprising computer readable program code embodied therein that, when executed by the processor, causes the processor to perform the operations comprising:
   storing an electronic document as a secure electronic file;
   identifying a signature space in the electronic document, the signature space, after being executed, includes a signature of a signing party of the electronic document;
   receiving, via a user interface, the signature of the signing party into the electronic document stored as the secure electronic file;
   responsive to receiving the signature of the signing party, converting the electronic document into a read only electronic document; and
   identifying a physical signing facility that provides products that are unrelated to a subject matter of the electronic document,
   wherein at least one of storing the electronic document as the secure electronic file, identifying the signature space in the electronic document, receiving the signature of the signing party into the electronic document stored as the secure electronic file, converting the electronic document into the read only electronic document, and identifying the physical signing facility that provides products that are unrelated to a subject matter of the electronic document is performed using a graphical user interface.

2. The computer system according to claim 1, wherein identifying the physical facility comprises:
   providing a list of a plurality of physical signing facilities to the signing party; and
   receiving a selection corresponding to the physical signing facility from the signing party.

3. The computer system according to claim 1, further comprising:
   receiving, from the signing party, an order for a selected product from the provided products; and
   sending the order to the physical signing facility.

4. The computer system according to claim 3, wherein sending the order to the physical signing facility comprises sending an identification for the selected product and a graphical representation of the signing party.

5. The computer system according to claim 3, further comprising providing payment to the physical signing facility for the selected product.

6. The computer system according to claim 3, providing, for the physical signing facility, marketing materials that are configured to accompany the selected product or that are configured to be displayed on a premises of the physical signing facility.

7. The computer system according to claim 3, before receiving, from the signing party, the order for the product, the method further comprising sending, to the signing party, a menu of the provided products.

8. The computer system according to claim 7, wherein the menu comprises a generic menu that corresponds to a type of product provided by the physical signing facility.

9. The computer system according to claim 3, further comprising sending a confirmation message a given time before a scheduled time for a planned signing session that includes identification of the selected product and directions to the physical signing facility.

10. The computer system according to claim 1, further comprising generating a searchable data file of physical signing facilities and corresponding locations, respectively.

11. The computer system according to claim 1, wherein the signing party is in the presence of a signature certifying agent.

12. The computer system according to claim 1, wherein the signing patty is remotely located from a signature certifying agent, the method further comprising:
   capturing a visual image of the signing via an image capture device on a device that is proximate the signing party by automatically tuning the image capture device to capture the actual signing in a signing video;
   communicating the signing video to the signature certifying agent; and
   receiving a signature certification from the signature certifying agent.

13. The computer system according to claim 12, wherein receiving the signature certification comprises receiving an image of a certified document that is executed by the signature certifying agent.

14. A computer program product comprising:
   a computer readable storage medium having computer readable code embodied in the medium, the computer code comprising:
   computer readable code to perform operations comprising:
   storing an electronic document as a secure electronic file;
   identifying a signature space in the electronic document, the signature space, after being executed, includes a signature of a signing party of the electronic document;
   receiving, via a user interface, the signature of the signing party into the electronic document stored as the secure electronic file;
   responsive to receiving the signature of the signing party, converting the electronic document into a read only electronic document;
   identifying a physical signing facility that provides services that are unrelated to a subject matter of the electronic document;
   receiving, from the signing party, an order for a selected service from the provided services; and
   sending the order to the physical signing facility,
   wherein at least one of storing the electronic document as the secure electronic file, identifying the signature space in the electronic document, receiving the signature of the signing party into the electronic document stored as the secure electronic file, converting the electronic document into the read only electronic document, and identifying the physical signing facility that provides services that are unrelated to a subject matter of the electronic document is performed using a graphical user interface.

15. The computer program product according to claim 14, wherein identifying the physical facility comprises:
   providing a list of a plurality of physical signing facilities to the signing party; and
   receiving a selection corresponding to the physical signing facility from the signing party.

16. The computer program product according to claim 14, wherein sending the order to the physical signing facility comprises sending an identification for the selected service and a graphical representation of the signing party.

17. The computer program product according to claim 16, further comprising computer readable code to provide payment for the selected service.

18. The computer program product according to claim 3, before receiving, from the signing party, the order for the selected service, the computer readable code to further configured to send, to the signing party, a menu of the provided services,
   wherein the menu comprises a generic menu that corresponds to a type of service provided by the physical signing facility.

19. The computer program product according to claim 14, further comprising computer readable code to send a confirmation message a given time before a scheduled time for a planned signing session that includes identification of the selected service and directions to the physical signing facility.

20. The computer program product according to claim 14, further comprising computer readable code to generate a searchable data file of physical signing facilities and corresponding locations, respectively.

* * * * *